No. 797,834. PATENTED AUG. 22, 1905.
D. ASHWORTH.
MECHANICAL MOVEMENT.
APPLICATION FILED OCT. 14, 1904.
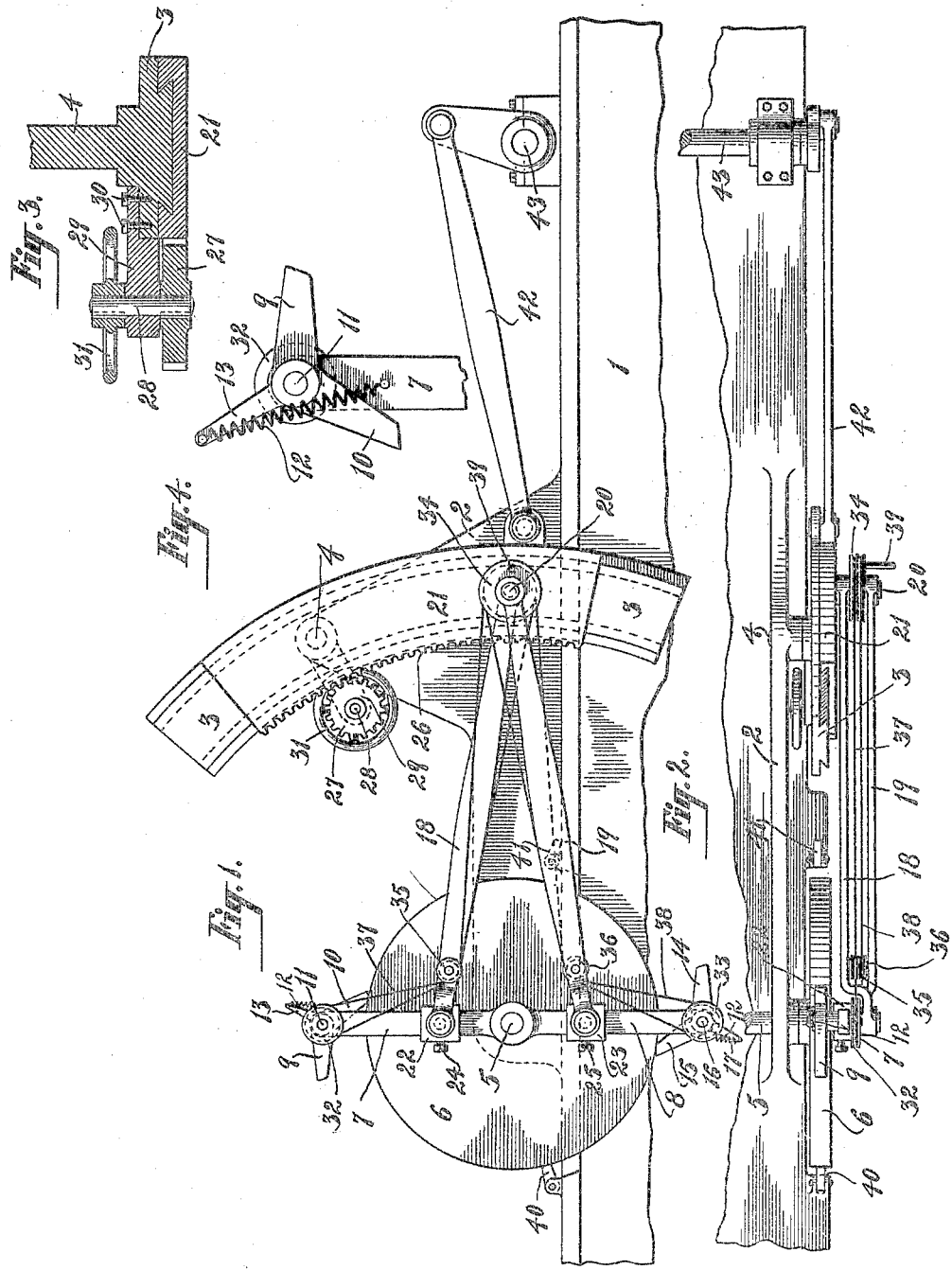

UNITED STATES PATENT OFFICE.

DANIEL ASHWORTH, OF WAPPINGERS FALLS, NEW YORK.

MECHANICAL MOVEMENT.

No. 797,834. Specification of Letters Patent. Patented Aug. 22, 1905.

Application filed October 14, 1904. Serial No. 228,379

*To all whom it may concern:*

Be it known that I, DANIEL ASHWORTH, a citizen of the United States, and a resident of Wappingers Falls, in the county of Dutchess and State of New York, have invented a new and useful Mechanical Movement, of which the following is a specification.

The object of this present invention is to provide certain improvements in the construction, form, and arrangement of the several parts of a mechanical movement whereby a very simple and easily-controlled mechanism is produced for converting a reciprocating motion into a rotary motion in either direction as desired, the speed of rotary motion being capable of accurate adjustment with respect to the speed of reciprocating motion.

In the accompanying drawings, Figure 1 represents the mechanism in side elevation, the parts being arranged in position to impart a rotary motion in the desired direction from a reciprocating motion. Fig. 2 is a top plan view of the mechanism. Fig. 3 is an enlarged detail section showing the means for adjusting the throw of the reciprocating device, and Fig. 4 is an enlarged detail view of one of the double pawls and the spring for yieldingly holding one or the other of the arms of the pawl in its operative position.

1 denotes a suitable support from which a bracket 2 rises. A rocking lever 3 is provided with a pivot 4, mounted in suitable bearings on the bracket 2. A rotary shaft 5 is mounted in suitable bearings in the bracket 2, which shaft is provided with a wheel 6 in substantially the same plane as the lever 3. Two arms 7 and 8 are loosely mounted on the shaft 5. The arm 7 is provided at its free end with a double pawl, the two arms of which are denoted by 9 and 10. This pawl is fixed to a stud-axle 11, mounted in the free end of the arm 7. The one or the other of the arms 9 10 is held in gripping engagement with the periphery of the wheel 6 by a spring 12, one end of which is secured to the arm 7 and the other end of which is secured to a finger 13, carried by the pawl. The arm 8 is similarly provided with a double pawl, the arms of which are denoted by 14 15, the stud-axle by 16, and the spring-engaged finger by 17.

Rods 18 and 19 lead from a common pivot-axle 20 on a block 21, carried by the lever 3, to the driving-arms 7 and 8, respectively, and are adjustably secured to said arms by means of slides 22 23, which may be secured at the desired distance from the shaft 5 by set-screws 24 25.

The pivot 20 for the inner ends of the rods 18 19 may be adjustable toward and away from the pivot 4 of the rocking lever 3 as follows: The block 21 has a longitudinally-curved tongue-and-groove engagement with the lever 3. The block 21 is provided with a rack 26, which is engaged by a pinion 27, fixed to a stud-shaft 28, mounted in a bracket-arm 29, secured by screws 30 to the lever 3. This stud-shaft 28 is provided with a hand-wheel 31 for the purposes of operating the pinion 27 for adjusting the pivot 20 toward and away from the pivot 4.

I provide the following means for bringing the desired pawl-arm of each double pawl into driving engagement with the wheel 6 of the rotary shaft to which the movement is to be imparted as follows: Single pulleys 32 33 are fixed to the stud-axles 11 and 16. A double pulley 34 is carried by the pivot 20. Double idler-pulleys 35 36 are mounted on the rods 18 19, respectively, and elastic bands 37 38 connect the double pulley 34 with the respective pulleys 32 33. The pulley 34 is provided with a suitable operating-handle 39. When the pulley 34 is moved in one direction, one pair of pawl-arms will be brought into engagement with the periphery of the wheel 6, and when the pulley is moved in the other direction the other pair of the pawl-arms will be brought into engagement with the periphery of the said wheel.

Pawls 40 41 are mounted on the support 1 in position to be alternately thrown into engagement with the periphery of the wheel 6, according to the direction in which it is intended to rotate the shaft 5 for preventing the reverse movement of the wheel.

A reciprocating movement may be imparted to the lever 3—as, for instance, through a pitman-rod 42, driven from some suitable source of power through a crank-shaft 43.

In operation the pivot 20 on the block 21 may be adjusted to the desired point with respect to the pivot 4 of the rocking lever 3. Also the front ends of the rods 18 19 may be adjusted on the arms 7 and 8 at the desired distance from the shaft 5. As a reciprocating motion is imparted to the lever 3 the arms 7 and 8 will be reciprocated. As they are moved back the lower pawl will impart a rotary movement to the shaft 5, while the upper pawl will slip idly upon the periphery of the wheel 6, and when the arms are moved forward the upper pawl will impart a rotary movement to the shaft 5, while the lower pawl slips idly along the lower portion of the said wheel.

It will be seen that when the pivot 20 is moved to a point in alinement with the pivot 4 no motion will be imparted to the shaft 5. As the pivot 20 is moved away from the pivot 4 the speed of movement of the shaft 5 is increased.

What I claim as my invention is—

1. A mechanical movement comprising a rocking lever, a block adjustable thereon across the axis of the lever, a shaft, an arm loosely mounted thereon, a wheel fixed to the shaft, a pawl carried by the arm fitted to engage the wheel for driving it and a rod connecting the block and arm.

2. A mechanical movement comprising a rocking lever, a block fitted to slide thereon, a shaft, an arm loosely mounted thereon, a wheel fixed to the shaft, a pawl carried by the arm fitted to engage the wheel for driving it, a rod connecting the arm and block and means for adjusting the block toward and away from the pivot of the rocking lever comprising a hand-wheel carried by the lever and a rack-and-pinion connection between the hand-wheel and block.

3. A mechanical movement comprising a rocking lever, a shaft, an arm loosely mounted thereon, a wheel fixed to the shaft, a double pawl carried by the arm, a rod connecting the arm and lever, pulleys carried by the pawl and lever, a band passing around the pulleys and means for turning the lever-pulley for bringing the one or the other of the pawl-arms into driving engagement with the wheel.

In testimony that I claim the foregoing as my invention I have signed my name, in presence of two witnesses, this 3d day of October, 1904.

DANIEL ASHWORTH.

Witnesses:
  JAMES S. ROY,
  ZACHARIAH V. HASBROOK.